3,074,814
TREATMENT OF CELLULOSIC MATERIALS
Robert Sause and William Elliot Stephen, Manchester, England, assignors to Imperial Chemical Industries Limited, London, England, a corporation of Great Britain
No Drawing. Filed Dec. 23, 1958, Ser. No. 782,358
Claims priority, application Great Britain Jan. 15, 1958
3 Claims. (Cl. 117—135.5)

This invention relates to the treatment of cellulosic materials with water soluble halogeno-1:3:5-triazine derivatives in order to confer thereon improved properties.

United States Patent 2,892,674 relates to a process for the modification of cellulosic materials which comprises treating cellulosic materials under aqueous alkaline conditions with a non-dyestuff compound, or a mixture of such compounds, containing at least one 1:3:5-triazine ring the carbons of which carry as substituents two halogen atoms and a residue of a primary or secondary amine bound via the nitrogen atom thereof and containing at least one negatively charged solubilizing group.

The present invention relates to a process for the modification of cellulosic materials under the conditions described above wherein the non-dyestuff compounds employed differ from those of United States Patent 2,892,674 in that each solubilizing group is positively charged or is non-ionic in character.

Thus according to the present invention we provide the improvement in or modification of the invention claimed in United States Patent 2,892,674 which comprises treating cellulosic materials under aqueous alkaline conditions with a non-dyestuff compound, or a mixture of such compounds, containing at least one 1:3:5-triazine ring the carbons of which carry as substituents two halogen atoms and an amino radical which is the residue of a primary or secondary amine bound via the nitrogen atom thereof and containing at least one positively charged solubilizing group or at least one non-ionic solubilizing group.

The positively charged solubilizing group may be for example a quaternary ammonium or phosphonium group and the non-ionic group may be for example a polyalkylene oxide residue or a sugar residue.

By the process of the invention valuable effects may be imparted to cellulosic textile materials such as improved resistance to attack by micro-organisms, improved softness, water repellancy or anti-soiling properties.

As examples of triazines containing positively charged solubilizing groups which may be used to modify cellulosic textiles according to the process of the invention there may be mentioned for example p-(4:6-dichloro-1:3:5-triazin-2-yl)aminophenyltrimethylammonium bromide, p-(4:6-dibromo--:3:5-triazin-2-yl)aminophenyltrimethylammonium iodide, p-(4:6-dichloro-1:3:5-triazin-2-yl)aminophenacyltrimethylammonium chloride, β-(4:6-dichloro-1:3:5-triazin-2-yl)aminoethyldiethyl dodecylammonium bromide and β-(4:6-dichloro-1:3:5-triazin-2-yl)aminoethyldiethyloctadecylammonium bromide.

As examples of triazines containing non-ionizing solubilizing groups which may be used to modify cellulosic textiles there may be mentioned for example the water soluble products carrying a residue of a primary or secondary amine and possessing a polyethenoxy chain made by the reaction of one molecular proportion of a cyanuric halide, advantageously the chloride, with one molecular proportion of an amine of the following general formula:

$$R_1(OC_2H_4)_nNR_2R_3$$

wherein $n$ is an integer greater than 1, $R_1$ is a hydrogen or a lower alkyl group containing up to 4 carbon atoms, $R_2$ is a hydrogen or an alkyl, aralkyl or aryl group and $R_3$ is a hydrogen or an alkyl, aralkyl or aryl group, at least one of the groups $R_2$ and $R_3$ being hydrogen. In place of the polyethenoxy chain the products may contain mixed ethenoxy and 1:2-propenoxy units or mixed ethenoxy and 1:2- or 2:3-butenoxy units.

Of the products containing a non-ionizing solubilizing group comprising a sugar residue there may be mentioned the glucosylamine derivatives, N-(4:6-dichloro-1:3:5-triazin-2-yl)glucosylamine and N-(4:6-dichloro-1:3:5-triazin-2-yl)-N-β-hydoxyethyl-glucosylamine.

In the following examples which illustrate the process parts and percentages are by weight.

*Example 1*

A length of cotton wigan cloth was impregnated in a cold aqueous solution of p-4:6-dichloro-1:3:5-triazin-2-yl)aminophenacyltrimethylammonium chloride containing 1.2% sodium bicarbonate so as to deposit on the cloth 1% (calculated on the dry weight of the cloth) of the triazine. The treated fabric was dried at 110° C. for 8 minutes and then washed for 5 minutes at the boil in a solution containing 0.1% of a non-ionic detergent, rinsed and dried. One half of the cloth was leached for 4 hours in cold running water.

The resistance of the leached and unleached fabric to rot and mildew organisms was tested by the mycelial mat test described in the National Bureau of Standards Miscellaneous Publication No. 188. The test organisms used were—

For mildew: Mixed spores of *Aspergillus niger* K16, *Penicillium italicum* K14 and *Cladosporium herbarum* K3.

For rotting: Spores of *Chaetomium globosum* K17

The leached and unleached materials were found to have improved resistance to these organisms compared with unmodified cotton.

*Example 2*

A viscose rayon staple fibre fabric was impregnated with a solution containing 0.5 part of β-(4:6-dichloro-1:3:5-triazine-2-yl)aminoethyldiethyloctadecylammonium bromide and 1 part of sodium bicarbonate in 98.5 parts of water. The pattern was squeezed, baked at 110° C. for 8 minutes and then washed in a solution containing 0.1% of a non-ionic detergent, rinsed and dried.

The treated fabric possessed a soft handle which was retained after further washing.

*Example 3*

A cotton wigan cloth was impregnated with a solution containing 10 parts of the reaction product of one molar proportion of β-(4:6-dichloro-1:3:5-triazin-2-ylamino) ethanol with 9 molar proportions of ethylene oxide and 10 parts of sodium carbonate in 80 parts of water and squeezed. It was then heated at 120° C. for 7 minutes and washed in a 0.1% solution of a non-ionic detergent, rinsed and dried.

The resulting modified cotton did not soil as readily as untreated wigan cloth on being washed in the presence of synthetically soiled cotton or on prolonged exposure to the atmosphere.

What we claim is:
1. In processes for modification of cellulosic textile materials, the improvement which consists essentially in a process for treating cellulosic textile materials under aqueous alkaline conditions with a non-dyestuff compound containing at least one 1:3:5-triazine ring,
    the 4- and 6-carbon atoms of which carry as substituents two halogen atoms, and
    the 2-carbon atom of said triazine ring is substituted by an amino radical selected from the class consisting of primary and secondary amino radicals which carry as substituents at least one member selected from the class consisting of quaternary ammonium positively charged solubilizing group, phosphonium positively charged solubilizing group, polyalkylene oxide non-ionic solubilizing group, and sugar radical non-ionic solubilizing group, attached to said amino radical through a carbon atom;

and thereafter drying said material.

2. Process according to claim 1 wherein the non-ionic solubilizing group is selected from the group consisting of polyethenoxy chain, chains containing ethenoxy units together with propenoxy units, and chains containing ethenoxy units together with butenoxy units.

3. Process according to claim 1 wherein the non-ionizing solubilizing group is a glucosylamine radical.

References Cited in the file of this patent

UNITED STATES PATENTS

| | | |
|---|---|---|
| 2,190,848 | Petersen et al. | Feb. 20, 1940 |
| 2,275,593 | Muskat et al. | Mar. 10, 1942 |
| 2,357,273 | Thurston | Aug. 29, 1944 |
| 2,802,754 | Ashby et al. | Oct. 3, 1950 |
| 2,868,788 | Luivisi | Jan. 13, 1959 |
| 2,879,181 | Aenishaenslim et al. | Mar. 24, 1959 |
| 2,887,409 | Loo | May 19, 1959 |
| 2,892,674 | Sause et al. | June 30, 1959 |
| 2,990,298 | Moyse et al. | June 27, 1961 |

FOREIGN PATENTS

| | | |
|---|---|---|
| 709,333 | Great Britain | May 19, 1954 |